(12) United States Patent
Rosson et al.

(10) Patent No.: US 11,777,622 B2
(45) Date of Patent: Oct. 3, 2023

(54) PROCESSING METHOD FOR A RADIO SIGNAL DISTURBED BY A RADAR SIGNAL

(71) Applicant: Commissariat à l'Energie Atomique et aux Energies Alternatives, Paris (FR)

(72) Inventors: Patrick Rosson, Grenoble (FR); Jean-Baptiste Dore, Grenoble (FR); Benoît Miscopein, Grenoble (FR); David Demmer, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 8 days.

(21) Appl. No.: 17/644,613

(22) Filed: Dec. 16, 2021

(65) Prior Publication Data

US 2022/0200714 A1 Jun. 23, 2022
US 2023/0045770 A2 Feb. 9, 2023

(30) Foreign Application Priority Data

Dec. 18, 2020 (FR) .................................... 20131661

(51) Int. Cl.
*H04B 17/336* (2015.01)
*G01S 7/02* (2006.01)
*H04B 15/00* (2006.01)

(52) U.S. Cl.
CPC ............ *H04B 17/336* (2015.01); *G01S 7/021* (2013.01); *H04B 15/00* (2013.01)

(58) Field of Classification Search
CPC .................................................. H04B 17/336
See application file for complete search history.

(56) References Cited

U.S. PATENT DOCUMENTS

| | | | |
|---|---|---|---|
| 2003/0022639 A1* | 1/2003 | Hongo | ................ H04L 27/2623 455/116 |
| 2003/0043925 A1 | 3/2003 | Stopler et al. | |
| 2004/0033789 A1 | 2/2004 | Tsien | |
| 2004/0239559 A1 | 12/2004 | King et al. | |
| 2006/0286935 A1* | 12/2006 | Utsunomiya | ......... H04W 16/14 370/445 |
| 2007/0077892 A1 | 4/2007 | Muquet | |

(Continued)

FOREIGN PATENT DOCUMENTS

| | | |
|---|---|---|
| EP | 0954755 A1 | 11/1999 |
| WO | 2006042274 A1 | 4/2006 |

OTHER PUBLICATIONS

Preliminary Search Report for French Application No. 2013661 dated Sep. 7, 2021, 2 pages.

(Continued)

*Primary Examiner* — Hsinchun Liao
(74) *Attorney, Agent, or Firm* — Moreno IP Law LLC (57) ABSTRACT

The present description concerns a method of processing by a radio transmitter/receiver (12) of a radio signal (SR) comprising a telecommunications signal disturbed by pulses of a radar signal, the method comprising the steps of: estimating the instantaneous power of the pulses, estimating the ratio of the average power of the telecommunications signal to the instantaneous power of the radar pulses, and modifying the radio signal at the locations of the radar pulses when said ratio is smaller than a threshold.

12 Claims, 6 Drawing Sheets

(56) References Cited

U.S. PATENT DOCUMENTS

2014/0220964 A1* 8/2014 Kurucz, Jr. ........... H04W 24/02
455/423
2018/0115909 A1 4/2018 Yankevich et al.

OTHER PUBLICATIONS

S.V. Zhidkov, "Analysis and Comparison of Several Simple Impulsive Noise Mitigation Schemes for OFDM Receivers," IEEE Trans. Comm., vol. 56, No. 1, Jan. 2008, pp. 5-9.

M. Mirahmadi et al., "BER Reduction of OFDM Based Broadband Communication Systems over Multipath Channels with Impulsive Noise," IEEE Trans. Comm., vol. 61, No. 11, Nov. 2013, pp. 4602-4615.

K.S. Al Mawali, "Techniques for Broadband Power Line Communications: Impulsive Noise Mitigation and Adaptive Modulation," Jul. 2011, RMIT University, PhD dissertation, 196 pages.

D. Shrestha, "Impulsive noise cancellation and channel estimation in power line communication systems," 2019, Universitat Politecnica de Catalunya, PhD disseration, 183 pages.

R. Barazideh, "Impulsive noise detection and mitigation in communication systems," 2019, Kansas State University, PhD disseration, 137 pages.

* cited by examiner

PROCESSING METHOD FOR A RADIO SIGNAL DISTURBED BY A RADAR SIGNAL

FIELD

The present disclosure generally concerns a processing method for a radio signal disturbed by a radar signal and a device of transmission and of reception of a radio signal for the implementation of such a method.

BACKGROUND

In telecommunications, the signal transporting information should transit through transmission means between a transmitter and a receiver. The signal is adapted to the direct transmission over the selected communication channel, wireless, wired, or optical. A radio transmission comprises using a radio-electric wave as a message transmission support. The transmission is performed by means of a radio transmitter and of an antenna, while the reception is performed on a radio receiver tuned to the same frequency.

Modulation can be defined as the process by which the signal is transformed from its original shape into a shape adapted to the transmission channel. The inverse operation enabling to extract the signal from the carrier is demodulation. The modulation converts binary information into voltage and/or current for the control of an antenna.

The object of digital modulations is to ensure a maximum flow of binary data in a given frequency band, with an error rate acceptable by the upstream and downstream protocols and correctors. A radio signal received by a receiver may be disturbed by parasitic signals. This may be the case for a radio transmitter/receiver, also called radio station, equipping a ship, called marine radio station hereafter, and exchanging radio signals with a radio station located onshore, and called onshore radio station hereafter. Indeed, other radio sources may be present on the ship operating at different frequencies and at different transmit powers, such as for example, a radar. The radio signal received by the station onboard the ship may then be disturbed by the radar signal.

There exist methods of processing a radio signal received by a radio station to remove parasitic signals. However, the implementation of such methods assumes to be able to detect parasitic signals in the radio signal, which may be difficult.

SUMMARY

An embodiment overcomes all or part of the disadvantages of known radio signal processing methods.

An embodiment provides a method of processing by a radio transmitter/receiver of a radio signal comprising a telecommunications signal disturbed by pulses of a radar signal, the method comprising the steps of:
  a) estimating the instantaneous power of the pulses;
  b) estimating the ratio of the average power of the telecommunications signal to the instantaneous power of the radar pulses; and
  c) modifying the radio signal at the locations of the radar pulses when said ratio is smaller than a threshold.

According to an embodiment, the radio signal is not modified when said ratio is greater than the threshold.

According to an embodiment, the threshold is smaller than or equal to the signal-to-noise ratio of the radio signal.

According to an embodiment, the method comprises the transmission of a request for not transmitting the telecommunications signal when the pulses have not been detected.

According to an embodiment, the method comprises the transmission of a request for increasing the amplification gain used to supply the radio signal when the pulses have not been detected.

According to an embodiment, step a) comprises a search for the pulses in the radio signal and a determination of the instantaneous power of the pulses when the pulses have been detected.

According to an embodiment, step a) comprises estimating the instantaneous power of the pulses when the pulses have not been detected in the radio signal.

According to an embodiment, the search for the pulses is carried out in first phases of the radio signal during which the telecommunications signal is likely to be transmitted when the instantaneous power of the pulses is greater than a power threshold and only in second phases of the radio signal during which the telecommunications signal cannot be transmitted when the instantaneous power of the pulses is smaller than said power threshold.

According to an embodiment, the telecommunications signal is transmitted in time division duplex mode, and comprises an alternation of phases of reception and of phases of transmission of the telecommunications signal separated by guard times, and the first phases comprise the reception phases and the guard times preceding them.

According to an embodiment, at step a), characteristics of the radar signal among the period of the pulses, and/or the duration of the pulses, and/or the period of mechanical rotation of the radar, and/or the histogram of the instantaneous powers of the pulses are determined according to the shooting angle of the radar over its mechanical rotation period.

According to an embodiment, at step c), the radio signal is set to zero at the locations of the radar pulses.

An embodiment also provides a device for processing a radio signal comprising a telecommunications signal disturbed by pulses of a radar signal, the device comprising:
  a module for determining the instantaneous power of the pulses or for estimating the instantaneous power of the pulses; and
  a module for determining the ratio of the average power of the telecommunications signal to the instantaneous power of the radar pulses and for modifying the radio signal at the locations of the radar pulses when said ratio is smaller than a threshold.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties. For the sake of clarity, only the steps and elements that are useful for an understanding of the embodiments described herein have been illustrated and described in detail. Unless specified otherwise, the expressions "around", "approximately", "substantially" and "in the order of" signify within 10%, and preferably within 5%.

In the following description, call radio signal the digital signal obtained by sampling and analog-to-digital conversion of an analog signal supplied by a radio antenna of a radio receiver capturing radio waves or a digital signal before digital-to-analog conversion for the control of a radio antenna of a radio transmitter. The radio signal particularly comprises a portion, called telecommunications signal or telecom signal, corresponding to the "useful" data exchanged between the transmitter and the receiver for a user and a portion corresponding to control signals used for the proper operation of the transmitter and/or receiver but containing no "useful" information for the user.

Figure 1:
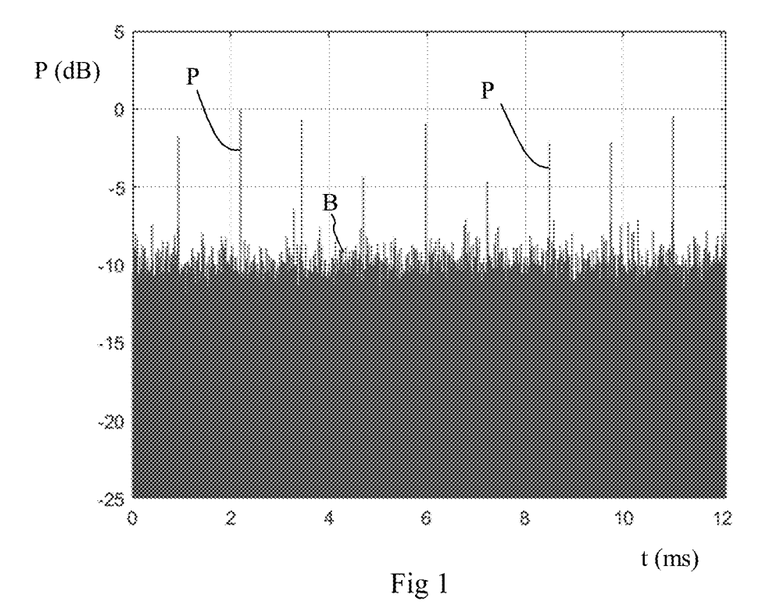
FIG. 1 is a curve of the time variation of the instantaneous power of a radar signal received by a radio receiver.

FIG. 1 is an example of a curve of the time variation of the instantaneous power P (in dB) normalized with respect to the maximum power of a signal received by a radio receiver after filtering in the absence of a telecom signal in the case where a parasitic radar signal is present. In this example, the filtering is performed to only keep the frequencies of the transmission channel, for example around 3.59 GHz for a telecommunications application. The parasitic radar signal corresponds to a signal transmitted by a pulsed radar at a frequency centered on 3.05 GHz rotating on itself with a period of a few seconds. In the example of FIG. 1, the basic signal B corresponds to the thermal noise of the radar receiver and peaks P correspond to the pulses of the radar signal. Although the radar and the radio station have different transmit frequencies, the radio receiver sees in its filtered band a contribution of the radar signal. Since the radar has a power much greater than the expected power of the telecom signal, its out-of-band noise is visible by the radio receiver when the latter has its maximum receive gain.

Figure 2:
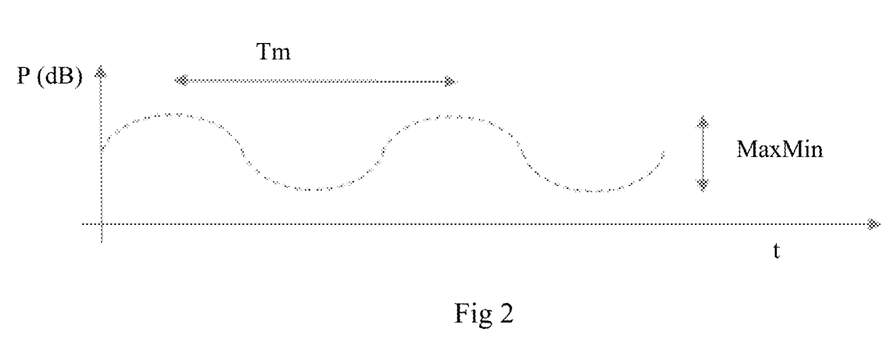
FIG. 2 is a model of the time variation of the envelope of the instantaneous power of a radar signal received by a radio receiver.

FIG. 2 shows a modeling of the time variation of the envelope of the instantaneous power P (in dB) of a radar signal received by a radio receiver. The periodic property of the obtained curve is induced by the mechanical rotation of the radar while the antenna of the radio receiver is considered as fixed over the duration of rotation of the radar antenna. The level of the received radar pulses depends on the distance between the radar and the telecommunications receiver, on the radar shooting angle, on the antenna diagram of the telecommunications receiver and on its orientation, and on the radar transmission power. The level of the received radar pulses varies during a rotation of the radar. Call Tm the revolution period of the radar. As an example, period Tm may vary from 1 to 10 seconds. As an example, the variations MaxMin of the radar power received by the radio receiver during the rotation of the radar may be in the order of 20 dB according to the radar shooting angle.

Figure 3:
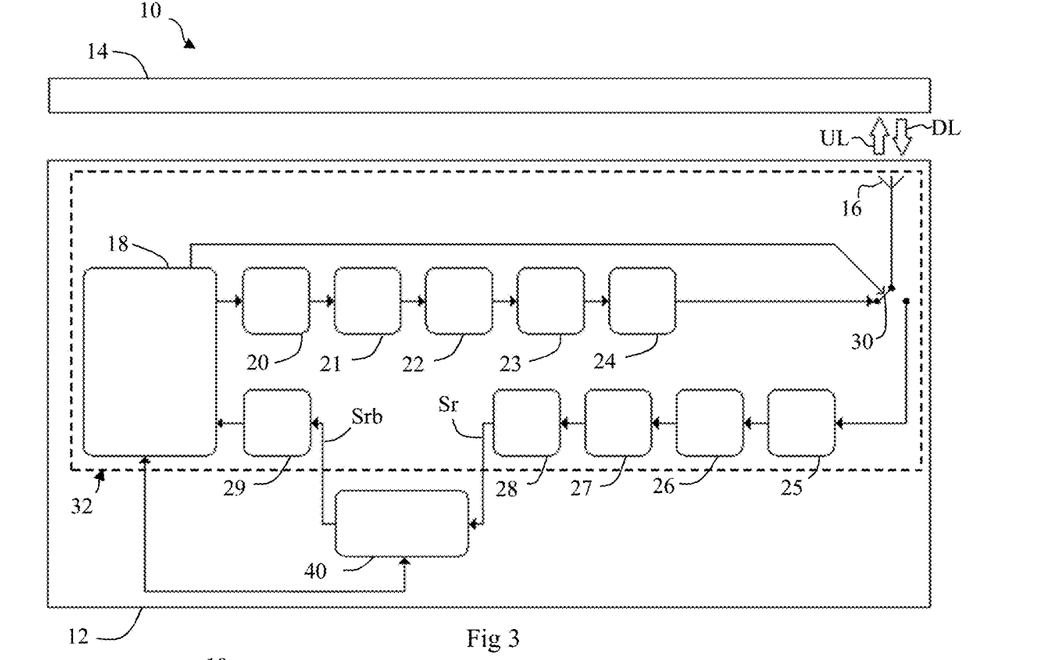
FIG. 3 partially and schematically shows an embodiment of a telecommunications system.

FIG. 3 partially and schematically shows an embodiment of a telecommunications system 10 comprising a first state 12 adapted to receiving radio signals DL transmitted by a second station 14 and adapted to transmitting radio signals UL to the second station 14. As an example, the first station 12 corresponds to a marine telecommunications station equipping a ship and the second station 14 corresponds to an onshore telecommunications station. According to an embodiment, the data transmission between stations 12 and 14 implements a multicarrier modulation, for example, the modulations used in mobile telephony networks, particular 4G LTE (Long Term Evolution) networks, 5G networks, modulations used in wireless WLAN (Wireless Local Area Network) networks, modulations used in wireless metropolitan area networks WMAN, Wi-Fi networks, and WiMAX (Worldwide Interoperability for Microwave Access) networks.

Marine station 12 comprises an antenna 16 for transmitting/receiving radio signals UL and DL and a processing unit 18. Marine station 12 comprises, in series in a transmitting portion of a transmission chain, a module 20 for coding digital signals supplied by processing unit 18, a digital-to-analog converter (DAC) 21, a stage 22 of frequency transposition from the baseband to the frequency band of the transmission channel, a high-power amplifier 23, and a bandpass filter 24. Marine station 12 further comprises, in series in a receiving portion of the transmission chain, a bandpass filter 25, a low-noise amplifier 26, a stage 27 of frequency transposition from the frequency band of the transmission channel to the baseband, an analog-to-digital converter (ADC) 28, and a decoding module 29. Decoding module 29 may also integrate the filtering, synchronization, channel equalization, channel tracking, and digital demodulation functions. Marine station 12 further comprises a switch 30, controlled by processing unit 18, and adapted to coupling antenna 16 to the transmitting portion of the transmission chain or to the receiving portion of the transmission chain. For the transmission of a radio signal by marine station 12, the digital signals supplied by processing unit 18 are coded by coding module 20 to make them less vulnerable to the imperfections of the transmission channel and to noise. Then, the digital signals are converted into analog signals by digital-to-analog converter 21. Modulator 22 transposes the analog signal to the desired frequency. The modulated signals are then amplifier by amplifier 23 and then filtered by bandpass filter 24, and finally transmitted to antenna 16. For the reception of a radio signal by marine station 12, the signal captured by antenna 16 is filtered by reception filter 25 and amplified by low-noise amplifier 26. Demodulator 27 delivers, from the filtered signal, an analog signal. Signal Sr, obtained after sampling and analog-to-digital conversion by converter 28, is sent to a module for characterizing and neutralizing the radar signal 40 which delivers a signal Srb. Decoding module 29 receives signal Srb and delivers a decoded digital signal to processing unit 18. The assembly comprising antenna 16, processing unit 18, switch 30, and modules 20, 21, 22, 23, 24, 25, 26, 27, 28, and 29 is called telecommunications module 32 of marine station 12 hereafter. Processing unit 18 and modules 20, 21, 22, 23, 24, 25, 26, 27, 28, and 29 may comprise at least one processor adapted to executing the instructions of a computer program or at least one dedicated electronic circuit.

Marine station 12 further comprises module 40 for characterizing and neutralizing the radar signal receiving signal Sr and delivering a signal Srb to decoding module 29. When module 40 is deactivated, signal Srb corresponds to signal Sr. When module 40 is activated, signal Srb corresponds to signal Sr to which a processing has possibly been applied to remove the parasitic pulses due to a radar signal. An example of processing, called blanking, comprises inserting zeros instead of the parasitic pulses previously detected in the demodulated digital signal. According to a variant, called clipping, a value is inserted into the demodulated signal instead of the parasitic pulses, which value may in particular depend on the amplitude of the radio signal before the parasitic pulse. This approach aims at saturating the power of the corrupt samples while keeping the initial phase of the complex signal. Module 40 is further adapted to exchanging data with processing unit 18.

Figure 4:
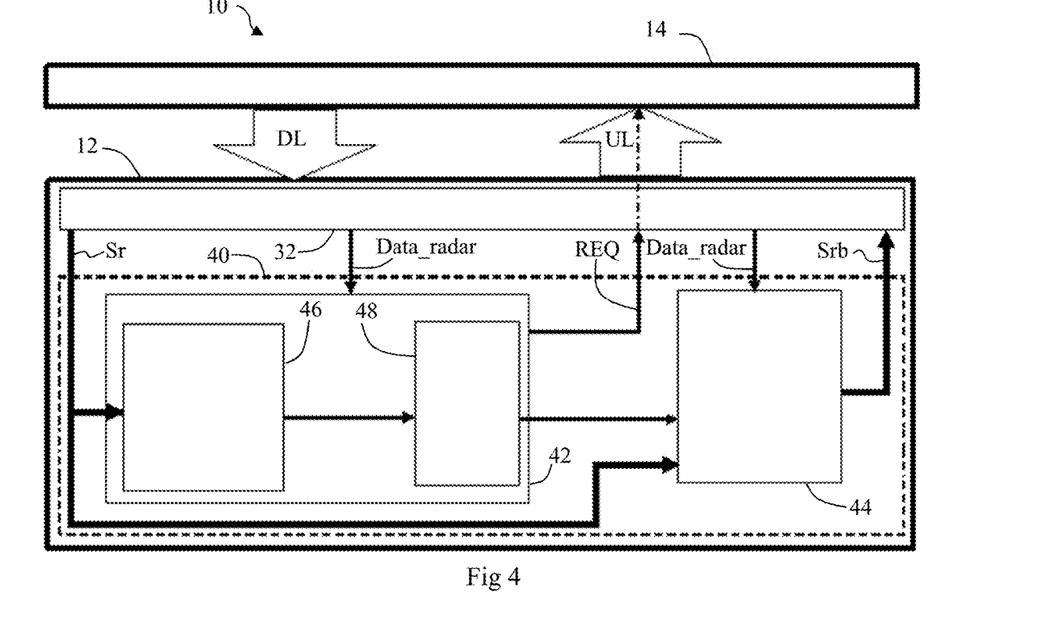
FIG. 4 partially and schematically shows an embodiment of a module of a station of the telecommunications system of FIG. 3.

FIG. 4 shows a more detailed embodiment of the module 40 of the telecommunications system 10 of FIG. 3. Radar signal characterization and neutralization module 40 comprises a radar signal characterization module 42 and a radar signal neutralization module 44. Radar signal characterization module 42 comprises a radar signal observation module 46 and a radar signal prediction module 48. Radar signal characterization module 42 receives signal Sr. Radar signal neutralization module 44 delivers signal Srb.

According to an embodiment, communication module 32 transmits to module 40 information Data_radar relative to the structure of the frames received by marine station 12. This information particularly depends on the communication method implemented between marine station 12 and onshore station 14.

According to an embodiment, radar signal characterization module 42 is adapted to transmitting to telecommunications module 32 requests RQ for modifying parameters of the communication method between stations 12 and 14.

Figure 5:
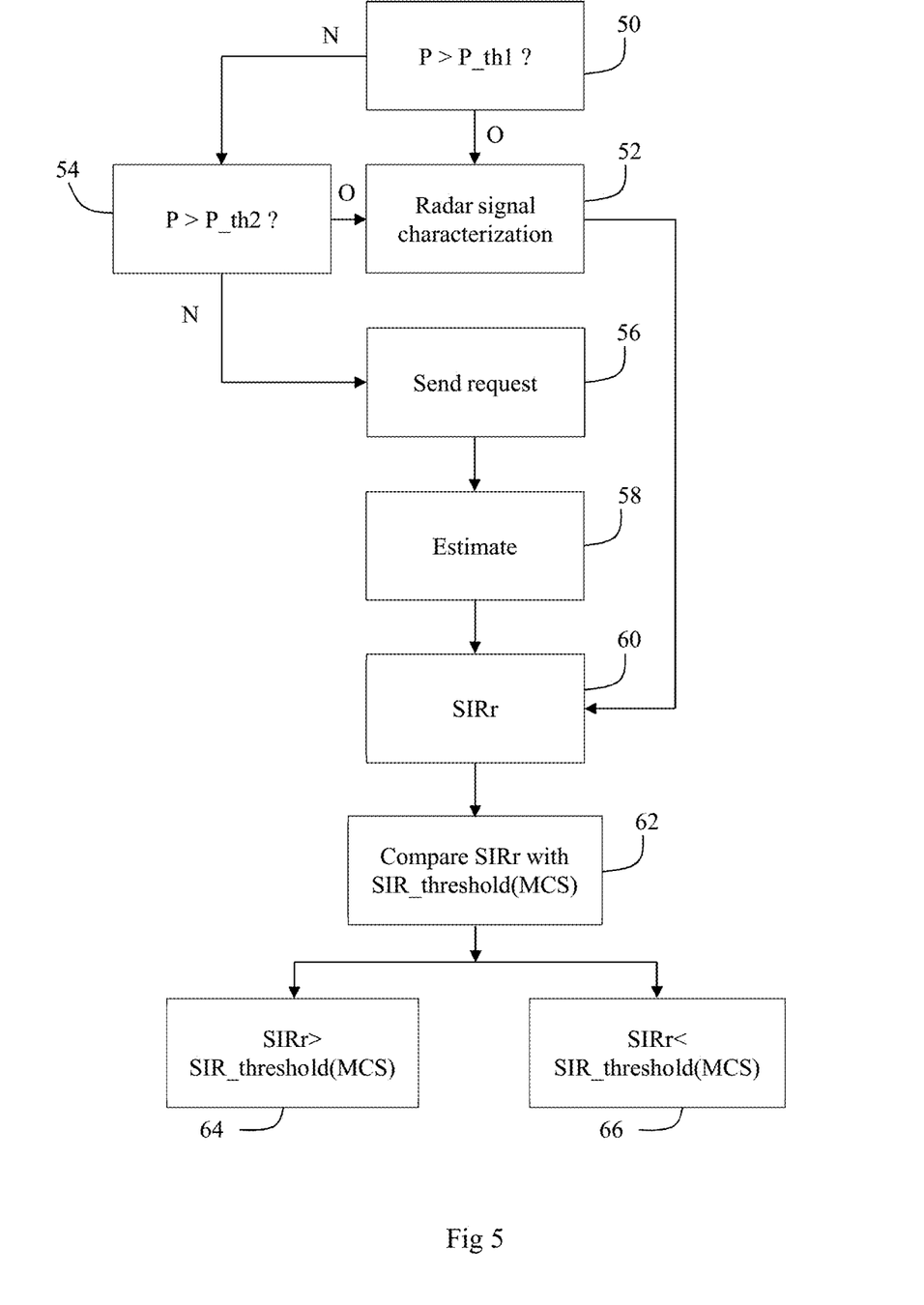
FIG. 5 is a block diagram of an embodiment of a method of processing a radio signal received by a station of the telecommunications system of FIG. 3.

FIG. 5 is a block diagram of an embodiment of a method of processing the signal Sr carried out by radar signal characterization and neutralization module 40.

The carrying out of the method of processing of signal Sr by the module 40 described hereafter may be controlled by telecommunications module 32.

At the first steps of the method, radar signal observation module 46 analyzes signal Sr to determine whether a parasitic radar signal is present.

More precisely, at step 50, module 46 searches from signal Sr during a first observation phase for radar pulses having an instantaneous power stronger than the average power of the received telecom signal. According to an embodiment, module 46 compares the instantaneous power of signal Sr with a first instantaneous power threshold P_th1. If a detection of the radar signal is obtained at step 50, that is, if the instantaneous power of signal Sr is greater than first threshold P_th1 (branch O), the method carries on at step 52. If no detection has been performed, that is, if the instantaneous power of signal Sr is smaller than first threshold P_th1 (branch N), this means that the radar signal, if present, has an instantaneous power stronger than the power of the noise of telecommunications module 32 but smaller than the average power of the received signal Sr. The method then proceeds to step 54.

At step 52, module 46 determines characteristics of the radar signal. The characteristics of the radar signal which are determined may comprise the period of the pulses, and the duration of the pulses, and/or the period of mechanical rotation of the radar, and/or the histogram of the powers of the pulses according to the shooting angle of the radar over its rotation period.

At step 54, module 46 searches from signal Sr during a second observation phase for parasitic radar pulses having an instantaneous power stronger than the noise of telecommunications module 32 but smaller than the average power of signal Sr. The second observation phase may be identical to the first observation phase (that is, starting and stopping at the same times) or may be different from the first observation phase (that is, starting and ending at different times). As described in further detail hereafter, the second observation phase is preferably limited to intervals during which there is no telecom signal. According to an embodiment, module 46 compares the instantaneous power of signal Sr with a second instantaneous power threshold P_th2. If a detection of the radar signal is obtained at step 54, that is, if the instantaneous power of signal Sr is greater than second threshold P_th2 (branch O), the method carries on at step 52 at which module 46 determines the characteristics of the radar signal as previously described. If no radar signal detection has been made at step 54, that is, if the radar pulses have not been detected during the second observation phase, which preferably comprises the guard times or the times when there was no symbol transmitted by onshore station 14 (branch N), the method carries on at step 56.

Module 46 is likely to be in one of two states. The first state corresponds to the detection of a radar signal and the second state corresponds to the lack of detection of a radar signal. According to an embodiment, module 46 transits to the second state if no radar pulse is detected at step 52 or at step 54 for a given time period, for example, the time period corresponding to a 360° mechanical rotation of the radar, that is, a full revolution. According to an embodiment, module 46 switches to the first state if at least a minimum number of pulses is detected for a given time period, for example, the time period corresponding to a 360° mechanical rotation of the radar. As an example, for a radar transmitting approximately 1,500 pulses over a full revolution of two seconds, the minimum number may be in the order of 15.

At step 56, module 42 sends a request REQ to telecommunications module 32 to modify parameters of the communication mode between stations 12 and 14 and/or operating parameters of telecommunications module 32 to increase the chances of detection of the radar signal at the next attempt of determination of the radar signal. According to an embodiment, module 42 requests increasing the duration of the first and/or second observation phase and/or increasing the sensitivity of telecommunications module 32. According to another embodiment, module 42 may request silence times (lack of radio signal transmission) to ease the detection of the radar signal, particularly if it has a lower power than that of the radio signal. In particular, module 42 may request from the onshore station not to transmit all along its transmission phases to create observation times during which only the radar is visible. The method carries on at step 58.

At step 58, radar signal prediction module 48 delivers an estimate of the location of the radar pulses in time when module 46 has not succeeded in detecting the radar pulses and/or an estimate of the power of the radar pulses when module 46 has not succeeded in detecting the radar pulses. The power of each radar pulse may be estimated from a modeling of the radar signal and from a signal for synchronizing the radar rotation with a period of revolution Tm. The radar rotation synchronization corresponds to times when the radar power is the strongest over its period of revolution Tm. The modeling can be obtained from the history over a given number of the last revolutions of the radar. As an example, for a radar transmitting approximately 1,500 pulses over a full revolution of two seconds, the last 30 revolutions of the radar may be taken into account, which corresponds to approximately 1 sliding minute and 120,000 consecutive radar pulses.

At step 60, radar signal neutralization module 44 determines data representative of the disturbances due to the radar, called SIRr ratio hereafter. The SIRr ratio is the ratio of the average power of the telecom signal to the instantaneous power of the radar signal when the latter is present. The power of the telecom signal is supplied by telecommunications module 32. In the case where the telecom signal is transmitted according to a multicarrier-type modulation, the average power may be determined over the duration of a symbol. The power of the radar signal is either the power determined by radar signal observation module 46 (if the radar pulse is detected), or the power estimated by radar signal prediction module 48 (if the radar pulse is not detected). The method carries on at step 62.

At step 62, module 44 compares the determined SIRr ratio with a threshold SIR_threshold(MCS). According to an embodiment, threshold SIR_threshold(MCS) depends on the modulation and coding scheme (MCS) of the current symbol. In the case where the SIRr ratio is greater than threshold SIR_threshold(MCS), the method carries on at step 64. In the case where ratio SIRr is smaller than first threshold SIR_threshold(MCS), the method carries on at step 66.

At step 64, in the case where ratio SIRr is greater than threshold SIR_threshold(MCS), it is considered that the radar signal is not disturbing and no radar pulse neutralization processing is implemented. Signal Srb is then identical to signal Sr.

At step 66, in the case where ratio SIRr is smaller than threshold SIR_threshold(MCS), a method of masking the radar pulses is then implemented to deliver a signal Srb transmitted to telecommunications module 32. According to an embodiment, the radar pulse neutralization step may comprise the implementation of a blanking-type masking method comprising replacing the pulses with zeroes in sampled signal Sr. Generally, it is known that a blanking-type masking method is not the most efficient and that, in this configuration, the clipping technique would be better adapted. However, a blanking-type masking method is advantageously simple to implement and, due to the short duration of the radar pulses, it may be implemented without degrading the processing of signal Srb by telecommunications module 32 as compared with another type of masking method.

Figure 6:
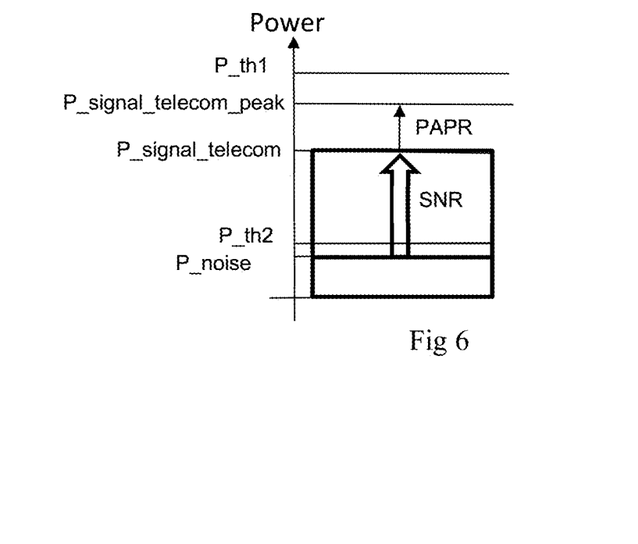
FIG. 6 illustrates the principle of determination of comparison threshold implemented by the method illustrated in FIG. 5.

FIG. 6 illustrates an embodiment of determination of thresholds P_th1 and P_th2. FIG. 6 shows, expressed in decibels, the noise power P_noise of telecommunications module 32, the average power P_signal_telecom of the telecom signal received by telecommunications module 32 in the absence of parasites, and the maximum power P_signal_telecom_peak of the telecom signal received by telecommunications module 32 in the absence of parasites. Power P_noise is directly linked to the amplification gain of telecommunications module 32.

Signal-to-noise ratio S/N (or SNR), also called signal-to-noise ratio SNR, defines the ratio of the average power P_signal_telecom of the telecom signal received by telecommunications module 32 to noise power P_noise. When the powers are expressed in decibels, the SNR is equal to the difference between power P_signal_telecom and power P_noise.

The PAPR (Peak-to-Average Power Ratio) represents the necessary oversizing ratio between the maximum power of the amplifier of telecommunications module 32 (the power for which it is designed), and the average power really transmitted. The PAPR is different from zero when the envelope of the radio signal is not constant. When the powers are expressed in decibels, the PAPR is equal to the difference between peak power P_signal_telecom_peak and average power P_signal_telecom. In particular, when a multicarrier-type modulation is implemented for the delivery of the radio signal, the PAPR may be in the order of 7 dB.

Figure 7:
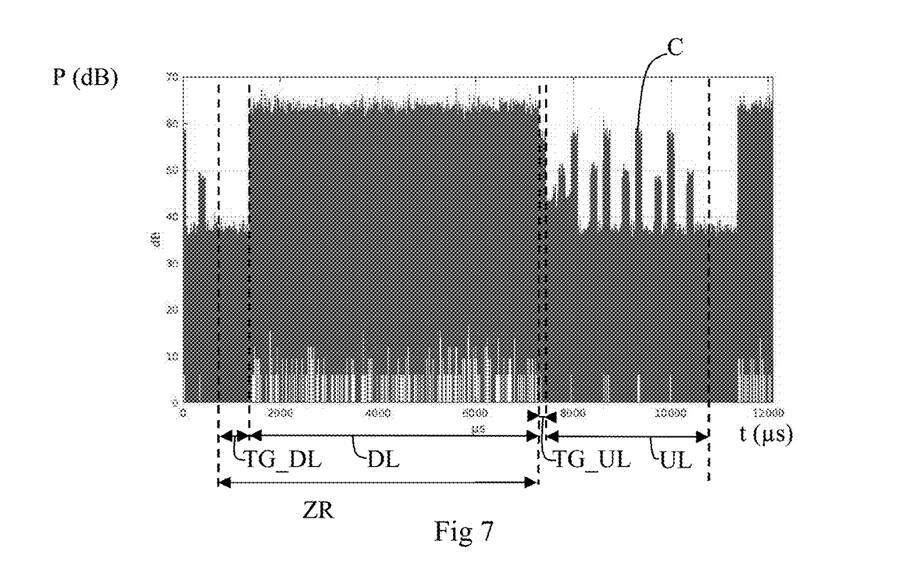
FIG. 7 shows a curve of time variation of the instantaneous power of a radio signal exchanged between two stations in time division duplex mode in the absence of disturbances by a radar signal.

FIG. 7 shows a curve of variation of power P, expressed in decibels (dB), according to the time of the signal Sr transmitted and received by the antenna 16 of station 12 in the absence of a parasitic radar signal. According to an embodiment, the communication between marine station 12 and onshore station 14 is performed in time-division duplex mode (TDD), that is, marine station 12 and onshore station 14 successively transmit in time in the same frequency band. According to another embodiment, the communication between marine station 12 and onshore station 14 is performed in frequency-division duplex mode (FDD).

In time-division duplex mode, the signal Sr at antenna 16 of marine station 12 comprises a succession of frames, each frame comprising the succession of four phases TG_DL, DL, TG_UL, and UL. Phase DL corresponds to the downward communication phase during which onshore station 14 can transmit data to marine station 12. In this drawing, phase DL is totally filled (100% of the time/frequency resources). Phase UL corresponds to the upward communication phase during which marine station 12 can transmit data to onshore station 14. In the example illustrated in FIG. 7, there is not transmission of "useful" data from marine station 12 to onshore station 14 during the shown phase UL. The only signals present during phase UL in FIG. 7 correspond to control signals C (driver signals and control messages) systematically transmitted by marine station 12 to onshore station 14. Each phase TG_DL and TG_UL, called guard time, corresponds to a phase of lack of transmission of signals between the two stations 12 and 14. In FIG. 7, the duration of phase TG_DL is much longer than the duration of phase TG_UL. Call reception phase ZR the phase comprising guard time TG_DL and the next phase DL. Call reception silence phase any phase during which marine station 12 transmits no data. The silence phase comprises each guard time TG_DL and TG_UL each listening phase of marine station 12 during each phase DL while no data are transmitted by onshore station 14, and each silence phase imposed during a phase UL.

Figure 8:
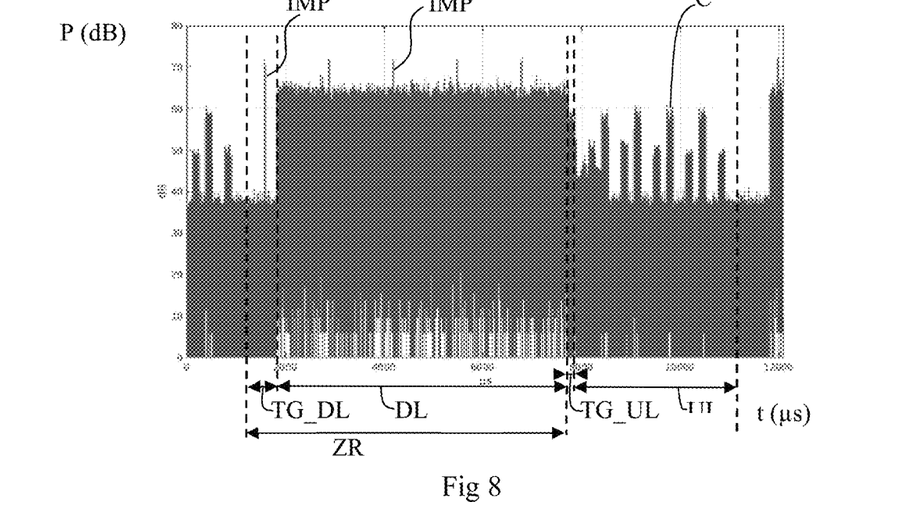
FIG. 8 is a drawing similar to FIG. 7 in the presence of disturbances by a radar signal.

FIG. 8 is a curve similar to FIG. 7 in the presence of a parasitic radar signal. Radar pulses IMP are particularly visible during phase DL in FIG. 8, which means that, in this example, the radar signal is very strong and a detection of the radar signal at previously-described step 50 is possible. If the radar signal is stronger than the reception noise but lower than threshold P-th1, an embodiment provides, at previously-described step 54, observing the radar signal during silence phases during which there is no received signal, particularly during guard time TG_DL or during phase DL if there is no traffic. In FIG. 8, 100% of the resources are used during phase DL. If for example only 10% of the resources are used, then phase DL comprises silence areas which are known by marine station 12 and it is possible to use them for the detection at step 54. In FIG. 8, if the radar pulses were lighter than the signal but stronger than the noise, it would be possible to detect a single radar pulse IMP during phase TG_DL, since duration TG_DL is shorter than the period between two radar pulses IMP in this example. This means that the detection at step 54 might not succeed. If the receiver is disturbed by the radar and it is not possible to detect it to characterize it, then an embodiment provides sending a silence request to the onshore station, at the previously-described step 56.

Threshold P_th1 can be determined by taking into account the dynamics of the analog-to-digital converter 28 of the telecommunications module 32 used to obtain sampled signal Sr and the control of the gain of this transistor. As an example, threshold P_th1 is equal to the sum of the average power of signal Sr during a phase ZR and of PAPR increased by 3 dB. As an example, threshold P_th2 is equal to the noise power increased by 3 dB.

According to an embodiment, the first observation phase at the step 50 previously described in relation with FIG. 5 corresponds to a phase ZR. Preferably, the first observation phase at the step 50 previously described in relation with FIG. 5 corresponds to each phase ZR. According to an embodiment, the second observation phase at the step 50 previously described in relation with FIG. 5 corresponds to the guard time TG_DL of a silence phase. Preferably, the second observation phase at step 54 previously described in relation with FIG. 5 corresponds to each silence phase.

According to an embodiment, at the previously-described step 58, module 42 asks telecommunications module 32 to increase the durations of the silence phases and/or to increase the amplification gain used by telecommunications module 32 to deliver signal Sr over these silence phases. The amplification gain should enable to detect the radar signal when the telecom signal is present, the maximum amplitude of the telecom signal should not exceed half the full scale, for example, +/−1,024 for a 12-bit analog-to-digital converter.

Considering again FIG. 4, according to an embodiment, telecommunications module 32 transmits to radar signal characterization and neutralization module 40 information relative to the structure of the frames received by marine station 12.

According to an embodiment, when a time-division duplex mode is implemented, telecommunications module 32 transmits to radar signal characterization module 42 the following information:

beginning and end of each reception phase ZR;

beginning and end of each silence phase; and the amplification gain used by telecommunications module 32 for the current frame.

According to an embodiment, in time-division duplex mode, telecommunications module 32 transmits to radar signal neutralization module 44 the following information:

the power of the radio signal per symbol; and the modulation and coding scheme (MCS) of the current symbol.

According to an embodiment, radar signal neutralization module 44 further stores a table containing the thresholds SIR_threshold(MCS) to be used according to each modulation and coding scheme of the waveform based on which the neutralization process must be activated. Thresholds SIR_threshold(MCS) may be determined by tests.

According to an embodiment, radar signal observation module 46 further receives data representative of the characteristics of the radar. These characteristics may comprise the radar rotation speed, the minimum and maximum periods of the radar pulses, and/or the minimum and maximum durations of the radar pulses. This enables to limit, or even to correct, the estimates of properties of the radar signal carried out by radar signal prediction module 48.

According to an embodiment, at the step 56 previously described in relation with FIG. 5, radar signal characterization and neutralization module 40 transmits to telecommunications module 32 a request REQ for increasing the durations of the silence phases. For example, for this purpose, during a phase UL, telecommunications module 32 may not transmit telecom signals during a frame, which does not correspond to a usual communication mode between stations 12 and 14. Marine station 12 may further ask onshore station 14 to allocate silence phases to estimate the location of the radar pulses in time and their power.

Simulations have been performed. For these simulations, the period of the radar pulses was equal to 1.3 ms. The activity duration, which corresponds to the ratio of the transmission duration to the period of occurrence of the pulses, was 3%. The period of revolution Tm of the radar was equal to 2 s. The communication mode between stations 12 and 14 was the time-division duplex mode. The frame period was 10 ms and the duration of a symbol was 500 µs.

First simulations have been performed by imposing to onshore station 14 one silence phase every 101 frames. This corresponds to a 1% flow rate loss.

Figure 9:
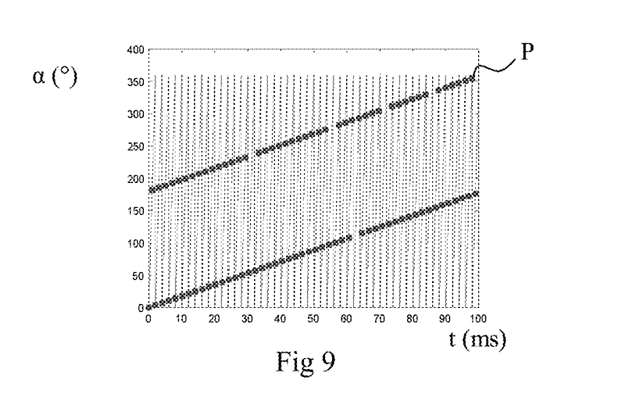
FIG. 9 shows a curve of time variation of the viewing angle of a radar.

FIG. 9 shows a curve of the time variation of the viewing angle α of the radar over time and each point P represents a time of measurement of the instantaneous power of the radar signal by the module 46 of station 12 for the first simulations.

Figure 10:
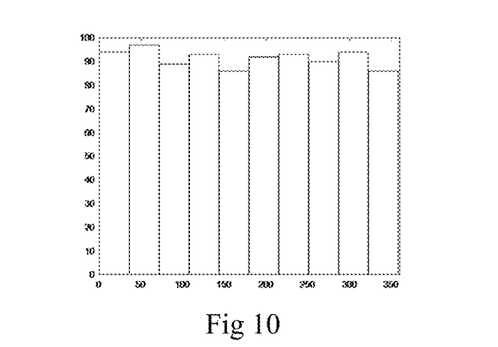
FIG. 10 shows a history of the viewing angles of a radar.

FIG. 10 shows a history of the number of measurements performed by the module 46 of station 12 during first simulations according to ranges of viewing angles of the radar.

FIGS. 9 and 10 highlight the possibility of scanning all the viewing angles of the radar and thus of obtaining a modeling of the evolution of the radar signal as shown in FIG. 2.

Second simulations have been carried out where a processing of the radio signal by blanking has been implemented. For the second simulations, the SIRr was in the order of 20 dB and the previously-described radar signal was present.

Figure 11:
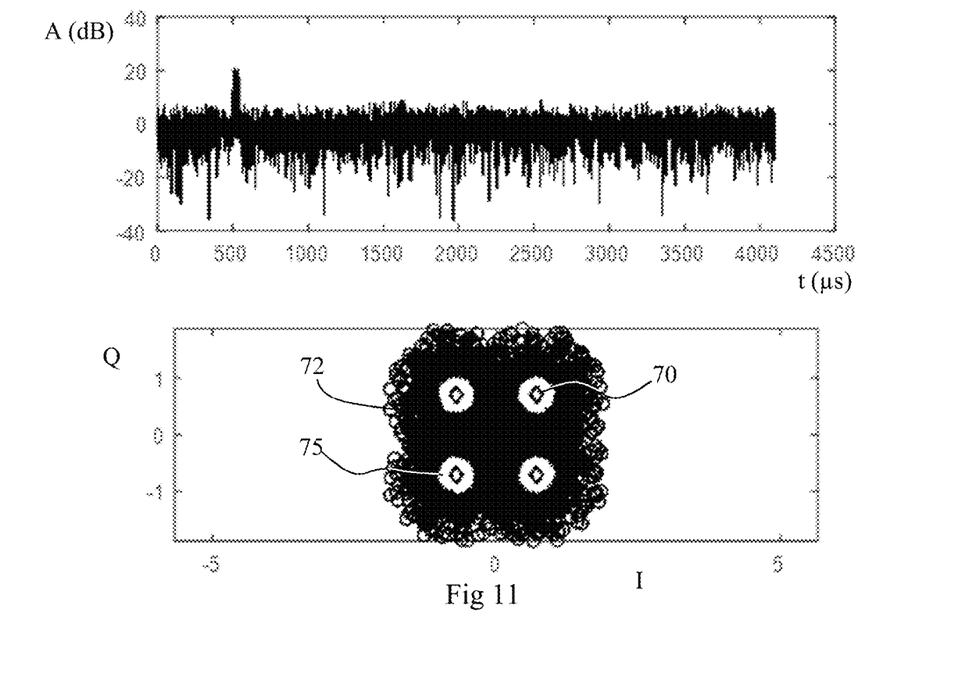
FIG. 11 shows, in its top portion, a curve of the time variation of the amplitude of a radio signal (multicarrier) polluted by impulse noise and, in its bottom portion, the demodulated signals in the I/Q constellation used for the transmission of the radio signal for a first transmission configuration.
Figure 12:
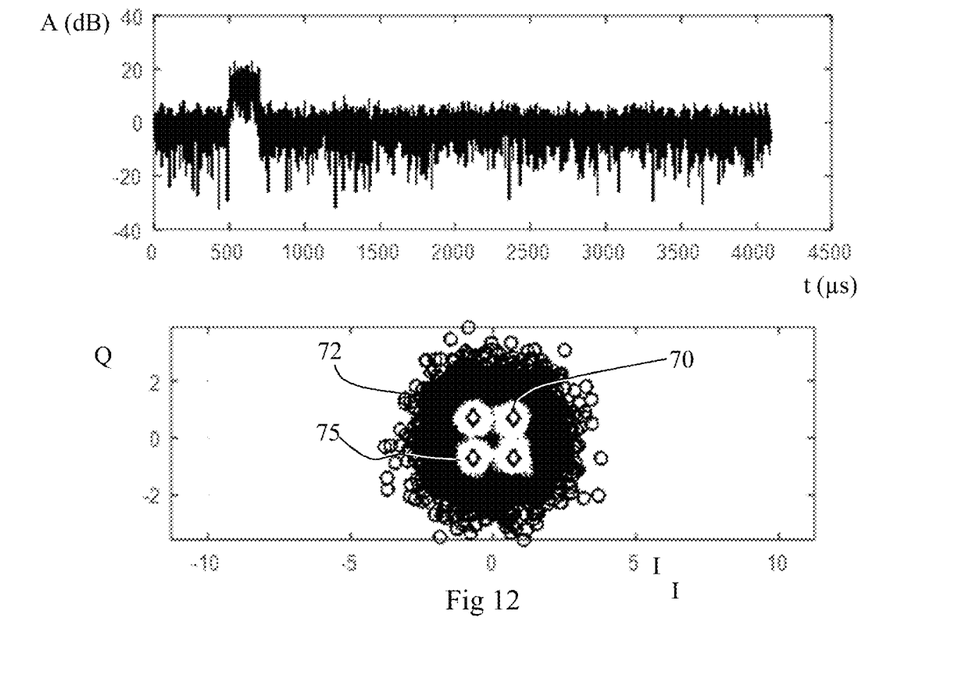
FIG. 12 is a drawing similar to FIG. 11 for a second transmission configuration with a longer pulse noise and an identical signal power-to-noise power ratio.

FIGS. 11 and 12 each show, in their top portion, a curve of the time variation of the amplitude A of radio signal Sr and in their bottom portion a constellation I/Q of the demodulated signal, diamonds 70 representing the points of the constellation, the black circles 72 representing the samples demodulated with no blanking processing, and the white areas 75 centered on the points 70 of the constellation indicating the locations of the samples demodulated with a blanking processing. FIG. 11 has been obtained when the impulse noise signal is active 1% of the time and FIG. 12 has been obtained when this signal is active 5% of the time.

According to another embodiment, the antenna 16 of station 12 is a mobile antenna. Radar signal characterization and neutralization module 40 may fully characterize the coupling between station 12 and the radar and obtain a function of the power of the received radar signal according to the radar viewing angle and the pointing angle of mobile antenna 16.

Module 40 can thus calibrate the radar power received for each pointing angle of mobile antenna 16 according to the direction of the radar shooting which depends on time when the radar is in operation and station 12 is inactive. The curve showing the angle of the radar antenna according to the angle of the antenna 16 of station 12 may be filtered and may be used as a model for the prediction by radar signal prediction module 48. In this case, telecommunications module 32 is adapted to transmitting to radar signal prediction module 48 the pointing information of antenna 16.

Various embodiments and variants have been described. Those skilled in the art will understand that certain features of these various embodiments and variants may be combined, and other variants will occur to those skilled in the art. In particular, although in the previously-described embodiments, the radio signal received by station 12 is disturbed by the radar signal originating from a single radar, it is clear that the previously-described radio signal processing method may be implemented when the radio signal received by station 12 is disturbed by radar signals originating from a plurality of radars.

Finally, the practical implementation of the described embodiments and variations is within the abilities of those skilled in the art based on the functional indications given hereabove.

What is claimed is:

1. Method of processing by a radio transmitter/receiver of a radio signal comprising a telecommunications signal disturbed by pulses of a radar signal, the method comprising the steps of:
    a) estimating instantaneous power of the pulses of the radar signal;
    b) estimating a ratio of average power of the telecommunications signal to the instantaneous power of the pulses of the radar signal; and
    c) modifying the radio signal at locations of the pulses of the radar signal when said ratio is smaller than a threshold.

2. Method according to claim 1, wherein the radio signal is not modified when said ratio is greater than the threshold.

3. Method according to claim 1, wherein the threshold is smaller than or equal to a signal-to-noise ratio of the radio signal.

4. Method according to claim 1, comprising the transmission of a request for not transmitting the telecommunications signal when the pulses of the radar signal have not been detected.

5. Method according to claim 1, comprising the transmission of a request for increasing the amplification gain used to supply the radio signal when the pulses of the radar signal have not been detected.

6. Method according to claim 1, wherein step a) comprises a search for the pulses of the radar signal in the radio signal and a determination of the instantaneous power of the pulses of the radar signal when the pulses of the radar signal have been detected.

7. Method according to claim 6, wherein step a) comprises estimating the instantaneous power of the pulses of the radar signal when the pulses of the radar signal have not been detected in the radio signal.

8. Method according to claim 6, wherein the search for the pulses of the radar signal is carried out in first phases of the radio signal during which the telecommunications signal is likely to be transmitted when the instantaneous power of the pulses of the radar signal is greater than a power threshold and only in second phases of the radio signal during which the telecommunications signal cannot be transmitted when the instantaneous power of the pulses of the radar signal is smaller than said power threshold.

9. Method according to claim 8, wherein the telecommunications signal is transmitted in time-division duplex mode, and comprises an alternation of phases of reception and of phases of transmission of the telecommunications signal separated by guard times, and wherein the first phases comprise the reception phases and the guard times preceding them.

10. Method according to claim 1, wherein, at step a), characteristics of the radar signal among the period of the pulses of the radar signal, and/or the duration of the pulses of the radar signal, and/or the period of mechanical rotation of the radar, and/or the histogram of the instantaneous powers of the pulses of the radar signal are determined according to the shooting angle of the radar over its mechanical rotation period.

11. Method according to claim 1, wherein, at step c), the radio signal is set to zero at the locations of the pulses of the radar signal.

12. Device of processing of a radio signal comprising a telecommunications signal disturbed by pulses of a radar signal, the device comprising:
    a module) for determining instantaneous power of the pulses of the radar signal or for estimating the instantaneous power of the pulses of the radar signal; and
    a module) for determining a ratio of average power of the telecommunications signal to the instantaneous power of the pulses of the radar signal and for modifying the radio signal at locations of the pulses of the radar signal when said ratio is smaller than a threshold.

* * * * *